(12) United States Patent
Zhang (10) Patent No.: US 9,825,951 B2
(45) Date of Patent: Nov. 21, 2017

(54) METHOD AND SYSTEM FOR DISTRIBUTING SERVICE DATA (71) Applicant: ZTE Corporation, Shenzhen, Guangdong (CN)

(72) Inventor: Yanchong Zhang, Shenzhen (CN)

(73) Assignee: XI'AN ZHONGXING NEW SOFTWARE CO.LTD., Xi'an (CN)

( * ) Notice: Subject to any disclaimer, the term of this patent is extended or adjusted under 35 U.S.C. 154(b) by 10 days.

(21) Appl. No.: 14/655,118

(22) PCT Filed: Dec. 24, 2013

(86) PCT No.: PCT/CN2013/090359
§ 371 (c)(1),
(2) Date: Jun. 24, 2015

(87) PCT Pub. No.: WO2014/101755
PCT Pub. Date: Jul. 3, 2014

(65) Prior Publication Data
US 2015/0358325 A1 Dec. 10, 2015

(30) Foreign Application Priority Data

Dec. 24, 2012 (CN) .......................... 2012 1 0567927

(51) Int. Cl.
*H04L 29/06* (2006.01)
*H04L 29/12* (2006.01)
(Continued)

(52) U.S. Cl.
CPC ........ *H04L 63/0892* (2013.01); *H04L 47/122* (2013.01); *H04L 61/203* (2013.01);
(Continued)

(58) Field of Classification Search
CPC ............ H04L 61/0375; H04L 47/122; H04W 28/0289
See application file for complete search history.

(56) References Cited

U.S. PATENT DOCUMENTS 7,916,732 B2    3/2011  Rydnell
8,432,871 B1 *  4/2013  Sarnaik ............ H04W 28/0289
                                                 370/331
(Continued)

FOREIGN PATENT DOCUMENTS

CN    101388901 A    3/2009
CN    102238634 A   11/2011
(Continued)

OTHER PUBLICATIONS

Samdanis et al., "Traffic Offload Enhancements for eUTRAN", 2011, pp. 884-896.*
(Continued)

*Primary Examiner* — Thaddeus Plecha
(74) *Attorney, Agent, or Firm* — Oppedahl Patent Law Firm LLC (57) ABSTRACT Provided are a method and system for distributing service data, wherein the method includes that a user terminal is authenticated and accesses a core network, a service data message sent by the user terminal is received, target address information contained in the service data message is acquired, and the service data message is distributed according to the acquired target address information.

12 Claims, 7 Drawing Sheets (51) Int. Cl.
*H04W 28/02* (2009.01)
*H04L 12/803* (2013.01)
*H04W 48/00* (2009.01)

(52) U.S. Cl.
CPC ........ *H04L 61/3075* (2013.01); *H04L 63/029* (2013.01); *H04W 28/0289* (2013.01); *H04W 48/17* (2013.01)

(56) References Cited

U.S. PATENT DOCUMENTS

| | | | |
|---|---|---|---|
| 9,392,522 B2* | 7/2016 | Stojanovski | H04L 45/22 |
| 2004/0125762 A1 | 7/2004 | Haller | |
| 2006/0133319 A1 | 6/2006 | Kant | |
| 2008/0181147 A1 | 7/2008 | Rydnell | |
| 2010/0027533 A1* | 2/2010 | Kant | H04L 45/00 370/355 |
| 2010/0202351 A1 | 8/2010 | Xi | |
| 2011/0182227 A1* | 7/2011 | Rune | H04W 8/082 370/312 |
| 2011/0185049 A1* | 7/2011 | Atreya | H04W 12/08 709/222 |
| 2011/0282931 A1* | 11/2011 | Chen | H04L 29/1216 709/203 |
| 2011/0292896 A1 | 12/2011 | Yeuom | |
| 2012/0076047 A1 | 3/2012 | Turanyi | |
| 2012/0084449 A1 | 4/2012 | Delos Reyes | |
| 2012/0182972 A1 | 7/2012 | Guan | |
| 2012/0300631 A1* | 11/2012 | Zee | H04W 76/025 370/235 |
| 2014/0036852 A1* | 2/2014 | Liu | H04W 40/04 370/329 |
| 2014/0119353 A1* | 5/2014 | McCann | H04W 76/022 370/338 |

FOREIGN PATENT DOCUMENTS

| | | |
|---|---|---|
| CN | 102625305 A | 8/2012 |
| CN | 102740401 A | 10/2012 |
| CN | 102802206 A | 11/2012 |
| EP | 2192728 A1 | 6/2010 |
| EP | 2485529 A1 | 8/2012 |
| WO | 2006055986 A2 | 5/2006 |
| WO | 2006059931 A1 | 6/2006 |
| WO | 2010062093 | 6/2010 |
| WO | 2010122511 A1 | 10/2010 |

OTHER PUBLICATIONS

Supplementary European Search Report in European application No. 13869789.1, dated Nov. 12, 2015.
International Search Report in international application No. PCT/CN2013/090359, dated Apr. 3, 2014.
English Translation of the Written Opinion of the International Search Authority in international application No. PCT/CN2013/090359, dated Apr. 3, 2014.
3GPP TS 23.402 V10.10.0, Dec. 2014.

* cited by examiner

METHOD AND SYSTEM FOR DISTRIBUTING SERVICE DATA

TECHNICAL FIELD

The present disclosure relates to the field of mobile communications, and particularly to a method and system for distributing service data.

BACKGROUND

Wireless Local Area Network (WLAN) technology enables more users to carry out a data service through a WLAN. With the development of services of users and the acceleration of WLAN construction by mobile operators, some services may be provided to a core network of the $3^{rd}$ Generation Partnership Project (3GPP) of a mobile operator through a WLAN, so as to access self-operated services of the 3GPP operator. An S2a/b/c interface is introduced into 3GPP 23.402 to support interworking between an Evolved Packet Core (EPC) and non-3GPP. In an EPC architecture, a WLAN access network may be connected to a Packet Data Network Gateway (PGW) directly as a credit extension network through an S2a interface. The S2a interface performs information interaction through a General Data Transfer Platform (GTP) or a Proxy Mobile Internet Protocol (PMIP). Before accessing a WLAN, a user terminal will be authenticated first by a 3GPP Authentication, Authorization and Accounting (AAA) server. During the authentication process, the 3GPP AAA server and an Access Controller (AC) decide, through a Service Set Identifier (SSID) of the user, subscription information and a device support condition, whether the user terminal can access an EPC core network. When it is determined that the user terminal is allowed to access the core network, the AC selects, according to a default Access Point Name (APN) subscribed by the user terminal, a PGW corresponding to the APN and establishes a tunnel for connection. Service data sent by the user terminal may be sent to the core network through the tunnel and a target server is accessed through the core network. When it is determined that the user is not allowed to access the core network, service data sent by the user terminal is distributed to the Internet through the AC. A current protocol architecture allows making a service of the user terminal provided to the core network or distributing the service to the Internet. However, requiring all services of the user terminal to be provided to the core network or the Internet is the only one option if the service of the user terminal is provided to the core network or distributed to the Internet according to the subscription information of the user. However, demands of users become more diverse with the development of intelligent terminals. A user terminal may have different service demands at the same moment. When all services of the user terminal are provided to the core network, the load of data traffic of the core network will be increased, thus many services will race to control network services. If all services are distributed to the Internet, a self-operated service of an operator, e.g. a multimedia message and so on, can be hardly accessed, thereby causing a loss to the benefits of the operator.

SUMMARY

The major technical problem to be solved by the present disclosure is to provide a method and system for distributing service data, thus solving an existing problem that all services of a user terminal are required to access a core network or the Internet when service data is distributed according to subscription information of the user terminal.

To solve the technical problem, an embodiment of the present disclosure provides a method for distributing service data, including that:

a user terminal is authenticated and accesses a core network;

a service data message sent by the user terminal is received;

target address information contained in the service data message is received; and the service data message is distributed according to the target address information.

In an embodiment of the present disclosure, the operation that the core network is accessed may include that:

a default APN of the user terminal is acquired;

a PGW is selected according to the default APN, and a transmission tunnel is established with the PGW.

In an embodiment of the present disclosure, the target address information may include target IP address information and target port information;

the operation that the service data message is distributed according to the acquired target address information may include that:

whether the target IP address information and target port information are matched with address information of a server Gateway (GW) corresponding to the PGW and port information of the default APN is determined respectively, or whether the target IP address information and target port information are matched with IP address information of the default APN and port information of the default APN is determined respectively; if matched, the service data message is sent through the transmission tunnel.

In an embodiment of the present disclosure, the method further may include that:

if the target IP address information is not matched with the address information of the server GW corresponding to the PGW or the IP address information of the default APN, and/or if the target port information is not matched with the port information of the default APN, then matching is performed to find a target APN according to the target IP address information and the target port information; if the matching succeeds, the service data message is sent through a transmission tunnel established by a network element of a PGW corresponding to the target APN; if the matching fails, the service data message is sent to the Internet.

In an embodiment of the present disclosure, the operation that the target APN is matched according to the target IP address information and the target port information may include that:

other APNs to which the user terminal is allowed to access are acquired;

the target IP address information is compared with IP address information of the other APNs to which the user terminal is allowed to access to determine whether there is an APN matched with the target IP address information; if here is an APN matched with the target IP address information, then whether the target port information is matched with port information of the APN is determined; if yes, the APN is the target APN.

In an embodiment of the present disclosure, the operation that the user terminal is accessed into the core network further may include that other APNs to which the user terminal is allowed to access are acquired; and PGWs are selected respectively according to the acquired APNs, and transmission tunnels are established with the selected PGWs respectively.

In an embodiment of the present disclosure, the operation that the service data message is sent through the transmission tunnel established by the network element of the PGW corresponding to the target APN may include that after the target APN is determined, the network element of the PGW corresponding to the target APN establishes the transmission tunnel; and the service data message is sent through the established transmission tunnel.

To solve the problem, the present disclosure further provides a system for distributing service data, including: an AC and an AAA server, wherein the AAA server is configured to authenticate a user terminal;

the AC is configured to make the user terminal access a core network, and to receive a service data message sent by the user terminal, acquire target address information contained in the service data message, and distribute the service data message according to the target address information.

In an embodiment of the present disclosure, the AAA server may be configured to provide a default APN of the user terminal for the AC;

accordingly, the AC may be configured to acquire the default APN of the user terminal from the AAA server, and to select a PGW according to the default APN, and establish a transmission tunnel with the PGW.

In an embodiment of the present disclosure, the AC may be configured to determine whether acquired target IP address information and target port information are matched with address information of a server GW corresponding to the PGW and port information of the default APN respectively, or determine whether acquired target IP address information and target port information are matched with IP address information of the default APN and port information of the default APN respectively; if matched, send the service data message through the transmission tunnel, wherein the target address information may include the target IP address information and the target port information.

In an embodiment of the present disclosure, the AC may be configured to match, if the target IP address information is not matched with the address information of the server GW corresponding to the PGW or the IP address information of the default APN, and/or the target port information is not matched with the port information of the default APN, a target APN according to the target IP address information and the target port information; if the matching succeeds, send the service data message through a transmission tunnel established by a network element of a PGW corresponding to the target APN; if the matching fails, send the service data message to the Internet.

In an embodiment of the present disclosure, the AAA server may be configured to provide the AC with other APNs to which the user terminal is allowed to access;

accordingly, the AC may be configured to acquire the other APNs to which the user terminal is allowed to access, compare the target IP address information with IP address information of the other APNs to which the user terminal is allowed to access to determine whether there is an APN matched with the target IP address information; if there is an APN matched with the target IP address information, determine whether the port information is matched with port information of the APN; if matched, determine that the APN is the target APN.

In an embodiment of the present disclosure, the AC may be configured to acquire other APNs to which the user terminal is allowed to access, select PGWs respectively according to the acquired APNs, and establish transmission tunnels with the selected PGWs respectively.

In an embodiment of the present disclosure, the AC may be configured to establish, after the target APN is matched, the transmission tunnel by the network element of the PGW corresponding to the target APN, and send the service data message through the established transmission tunnel.

The present disclosure has the following beneficial effect.

In a method and system for distributing service data according to the present disclosure, after a user terminal is authenticated and accesses a core network, target address information is acquired from a service data message when the service data message sent by the user terminal is received. The service data message is further distributed according to the acquired target address information instead of being distributed according to subscription information of the user terminal according to the prior art. In the meanwhile, a service not used by the terminal may be provided to the core network or the Internet according to an APN of the service by using the target address information contained in the service data message instead of having to providing all services of the user terminal to the core network or the Internet in the prior art.

DETAILED DESCRIPTION

When a service data message of a user terminal is distributed, the present disclosure acquires target address information from a service data message and distributes the service data message according to the acquired target address information instead of distributing the service data message according to subscription information of the user terminal in the prior art. Therefore, a service not used by the user terminal may be provided to a core network or the Internet selectively according to an APN of the service, thus ensuring that a network resource can be distributed normally and orderly while ensuring the benefits of operators.

The present disclosure will be further expounded below through specific embodiments in combination with the accompanying drawings.

Embodiment 1

Figure 1:
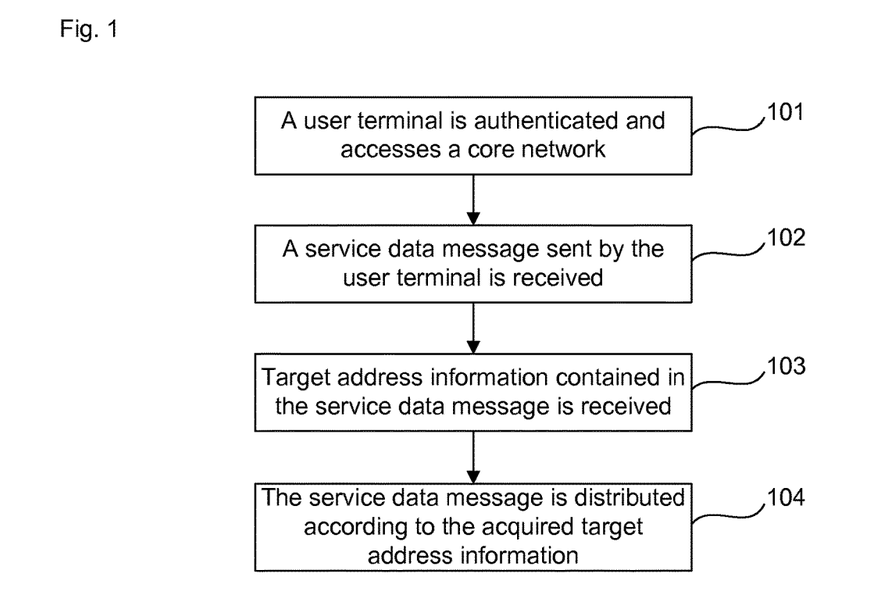
FIG. 1 is a schematic diagram of a process of distributing service data of a user in the first embodiment of the present disclosure.

In the present embodiment, please refer to FIG. 1 for a major process of distributing service data of a user, including the following steps:

Step 101: A user terminal is authenticated and accesses a core network;

Step 102: A service data message sent by the user terminal is received;

Step 103: Target address information contained in the service data message is received; and Step 104: The service data message is distributed according to the acquired target address information;

wherein in the Step 101, the operation that the user terminal is authenticated refers to that the user terminal is authenticated by a 3GPP AAA server before accessing an WLAN. During the authentication process, the 3GPP AAA server and an AC will determine whether the user terminal is allowed to access an EPC of a core network according to an SSID, subscription information and a device support condition of the user terminal. If not allowed, the user terminal accesses the Internet through the AC and the AC distributes an IP address, a Domain Name System (DNS) address and a GW address for the user terminal. If allowed, the user terminal accesses the core network.

Figure 2:
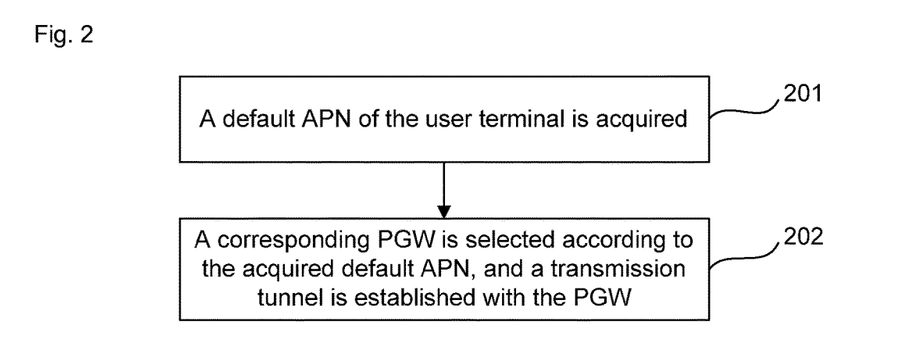
FIG. 2 is a schematic diagram of a process of making a user terminal access a core network in FIG. 1.

FIG. 2 shows a process of making the user terminal access the core network, including the following steps:

Step 201: A default APN of the user terminal is acquired;

the step specifically includes that the AC acquires the default APN (i.e. an access point) of the user terminal from the 3GPP AAA server; and Step 202: A PGW is selected according to the acquired default APN, and a transmission tunnel (called as a default transmission tunnel in the present embodiment) is established with the PGW, wherein during the establishment process of the tunnel, the PGW allocates an IP address and a DNS address for the user terminal, and the AC sends the user terminal the IP address, and a DNS address and a GW address configured by the AC itself for the user terminal.

When the user terminal carries out a data service and initiates a DNS request, the DNS request will be sent to a DNS server configured by the AC. If the DNS server is provided with a corresponding domain name, a corresponding IP address is sent to the terminal. Otherwise, a request will be initiated to a DNS server of the core network and a DNS server of an upper layer, and an acquired IP address is sent to the user terminal.

The data service may be carried out after the user terminal is authenticated successfully and acquires an IP address thereof, wherein the target information acquired from the service data message after the AC receives the service data message sent by the user terminal may include target IP address information (preferably a target IP address) and target port information (preferably a target port number) in the Step 103. Of course, other target information may be also acquired on this basis according to a practical condition, so as to replace or change the target IP address information and the target port information.

Figure 3:
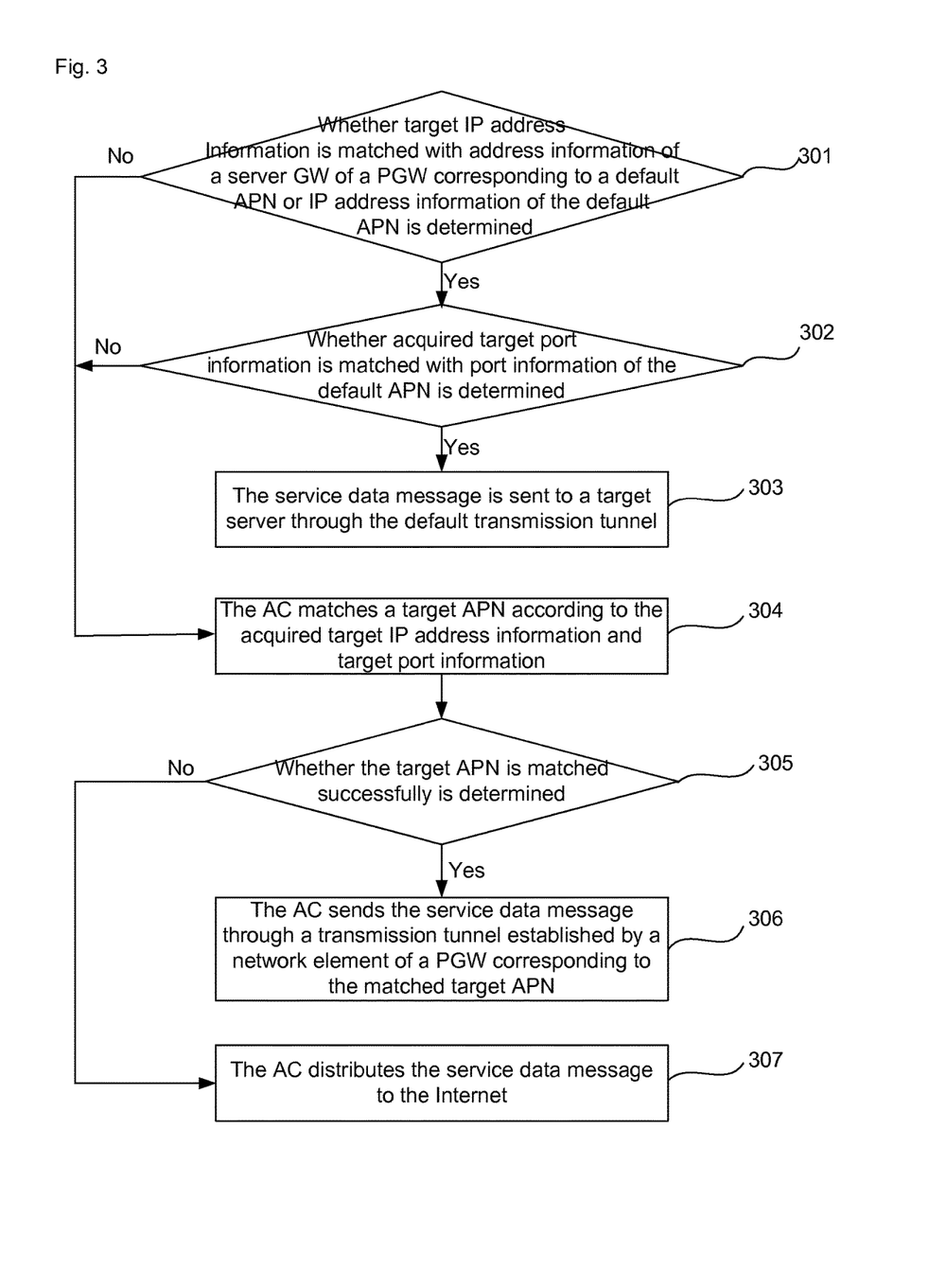
FIG. 3 is a schematic diagram of a process of distributing a service data message according to acquired target address information in FIG. 1.
Figure 4:
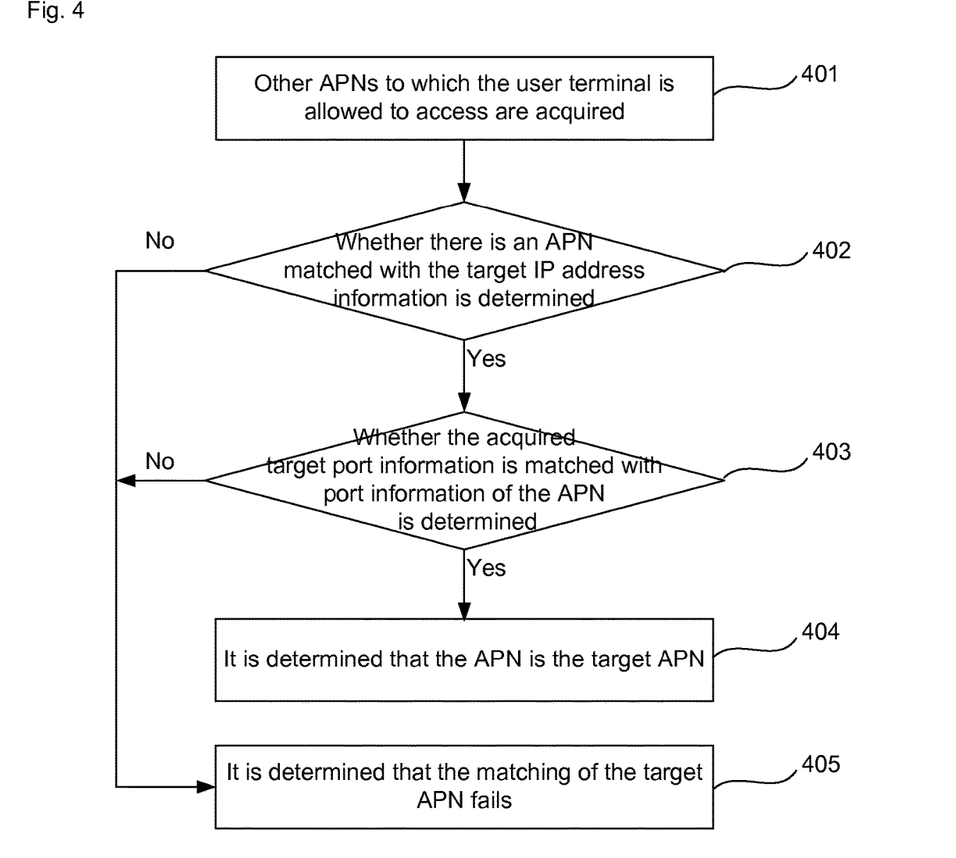
FIG. 4 is a schematic diagram of a process of matching a target APN by an AC according to target IP address information and target port information in FIG. 3.

After the target IP address information and the target port information contained in the service data message sent by the user terminal are acquired, please refer to FIG. 3 for the distribution of the received service data message according to the acquired target address information in the Step 104, including the following steps:

Step 301: The AC determines whether the acquired target IP address information is matched with address information of a server GW of the PGW corresponding to the default APN or IP address information of the default APN; if matched, Step 302 is performed; otherwise, Step 304 is performed;

Step 302: The AC determines whether the acquired target port information is matched with port information of the default APN; if matched, Step 303 is performed; otherwise, Step 304 is performed;

notably, there is no strict limit for a time sequence between Step 301 and Step 302;

Step 303: The AC sends the service data message to a target server through the default transmission tunnel and the processing flow is terminated;

Step 304: The AC matches a target APN according to the acquired target IP address information and target port information;

Step 305: The AC determines whether the target APN is matched successfully; if the matching succeeds, Step 306 is performed; otherwise, Step 307 is performed;

Step 306: The AC sends the service data message through a transmission tunnel established by a network element of a PGW corresponding to the target APN and the processing flow is terminated; and Step 307: The AC distributes the service data message to the Internet;

wherein, in the Step 304, a specific process that the AC matches the target APN according to the target IP address information and the target port information acquired from the service data message is as shown in FIG. 4, including the following steps:

Step 401: Other APNs to which the user terminal is allowed to access are acquired;

specifically, the AC acquires from the 3GPP AAA server the other APNs to which the user terminal is allowed to access. The 3GPP AAA server may send the AC the APNs to which the user is allowed to access during the authentication process of the user terminal, and may also send the AC the APNs to which the user is allowed to access after receiving a corresponding request sent by the AC;

Step 402: The AC compares the acquired target IP address information with IP address information of the other APNs to which the user terminal is allowed to access to determine whether there is an APN matched with the target IP address information; If there is an APN matched with the target IP address information, Step 403 is performed; otherwise, Step 405 is performed;

Step 403: The AC determines whether the acquired target port information is matched with port information of the APN; if matched, Step 404 is performed; otherwise, Step 405 is performed;

Step 404: It is determined that the APN is the target APN, and the processing flow is terminated; and Step 405: It is determined that the matching of the target APN fails.

After the target APN is matched according to the matching process as shown in FIG. 4, the service data message may be sent according to the target APN (the default APN) besides the default APN. It should be noted that the establishment of the tunnel between the AC and the target APN in the present embodiment may be static, or may be also dynamic. When the static establishment is selected, during the authenticating process for the user terminal, after the user is authenticated successfully and the AC establishes the tunnel with the PGW corresponding to the default APN, the AC triggers a process of establishing a tunnel with a PGW corresponding to a non-default APN if it is determined that the user terminal is further allowed to access other non-default APNs. An IP address allocated by the non-default APN to the terminal is stored locally in the AC and is not sent to the terminal. When the dynamic establishment method is applied, the AC only establishes the transmission tunnel with the PGW corresponding to the default APN during the authentication process. After receiving the service data message sent by the user terminal, the AC determines, according to the target IP address information and the target port information contained in the service data message, that the service data message is accessed to a non-default APN, then the AC initiates establishment of a transmission tunnel with a PGW corresponding to the non-default APN. After the transmission tunnel is established successfully, the non-default target PGW will allocate an IP address for the terminal and the IP address needs to be stored in the AC.

In the present embodiment, when the message of the user is sent to the non-default target PGW via the AC, a source IP address of the message is replaced by the IP address allocated for the terminal by the target PGW, and after the AC receives the message sent by the PGW to the terminal, the target IP address is replaced by the IP address allocated for the terminal by the default PGW. Further description will be made hereinafter in combination with a specific embodiment.

Thus, the service data message may be sent to a target server through a corresponding established transmission tunnel after matching is performed through the matching process as shown in FIG. 4 when the present embodiment applies the static establishment method, while a transmission tunnel further needs to be established with a target APN after the APN is matched and the service data message is transmitted to a target server through the tunnel subsequently when the dynamic establishment method is applied.

Embodiment 2

It may be determined in the present embodiment of the present disclosure that a service data message of a user terminal is distributed to a core network or the Internet according a target IP address and a port number of the user terminal in an AC. In addition, when an APN corresponding to a target IP address of the service data message is a non-default APN, a tunnel between the AC and a PGW corresponding to the non-default APN may be further maintained dynamically or statically. The present disclosure will be further described below in combination with the accompanying drawings according to different situations in order to better understand the present disclosure.

Figure 5:
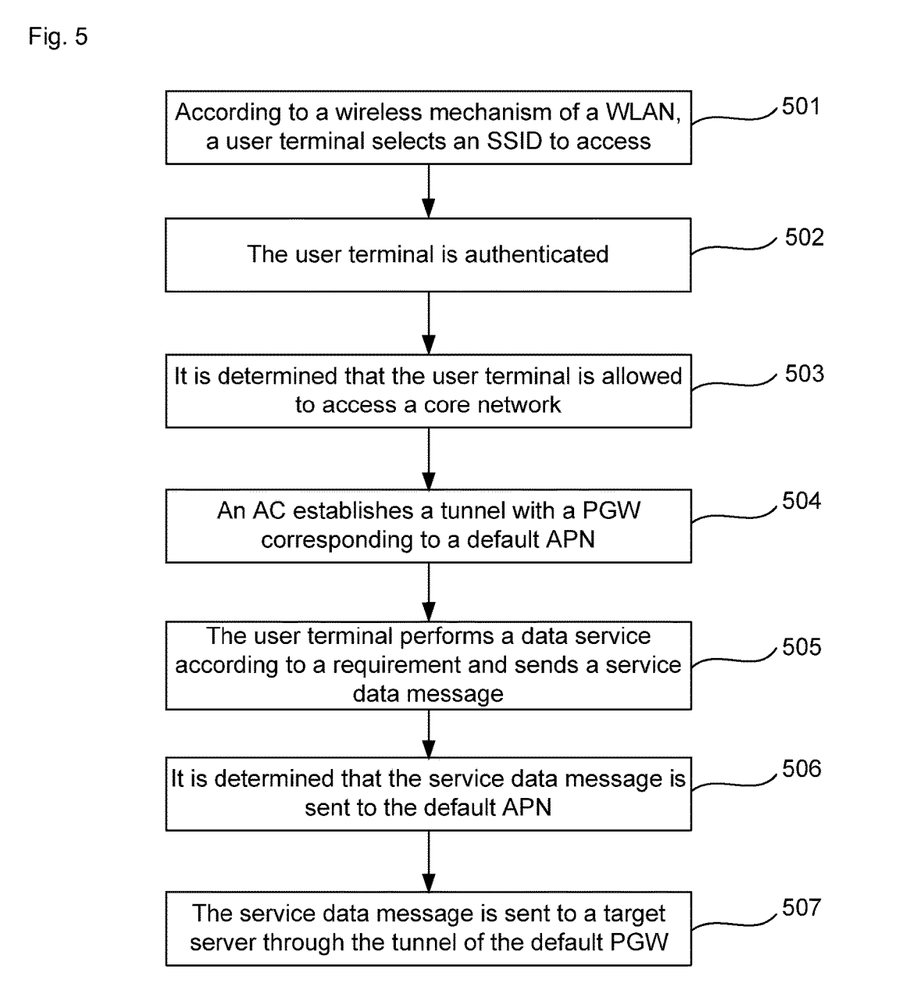
FIG. 5 is a schematic diagram of a process of sending a service data message to a default PGW by an AC in the second embodiment of the present disclosure.

Referring to FIG. 5, a process of sending a service data message to a default PGW by an AC is as follows:

Step 501: According to a wireless mechanism of a WLAN, a user terminal selects an SSID to access;

Step 502: The user terminal is authenticated; as a user authentication point, a Trusted WLAN Access Network (TWAN) triggers an authentication process of the user terminal by a 3GPP AAA server; after being authenticated successfully, the user is accesses the WLAN successfully;

Step 503: During the authentication process, an AC and the 3GPP AAA server will decide whether the user is allowed to access a core network; the 3GPP AAA server carries a default APN subscribed by the user terminal to the AC and provides the AC with a list of all subscribed APNs which are allowed to access; It is assumed here that the user terminal is allowed to access the core network;

Step 504: The AC selects, according to the subscribed default APN, a PGW corresponding to the default APN to establish a tunnel; during a process that the AC establishes the tunnel with the PGW, the PGW allocates an IP address, a DNS address and a GW address for the terminal; The AC sends the terminal the IP address allocated by the PGW and a DNS address and a GW configured by the AC itself. A source address of the terminal is the address distributed by the PGW;

Step 505: The user terminal carries out a data service according to a requirement and sends a service data message. The user terminal may perform the data service after being allocated with the IP address, the DNS address and the GW address. When the user terminal needs to resolve a domain name, a DNS request will be sent to a DNS server configured by the AC. If the DNS server fails to resolve the domain name, the request will be sent to a domain name server of the core network or an upper DNS server until a target IP address is resolved;

Step 506: After receiving service data messages sent by the user terminal, the AC analyzes each service data message and parses out a target IP address and a target port number of each service data message of the user. During the authentication process of the user terminal with the 3GPP AAA server, the 3GPP AAA server sends the AC the default APN subscribed by the user and the APNs which are allowed to access. The AC determines, according to the target IP address acquired through the parsing, whether the target IP address is a target IP address that can access the default APN, it is determined herein that they are the same; whether the target port number acquired through the parsing is a port allowed access to the default APN is further determined, and it is also determined here that the port is allowed to access to the default APN; and Step 507: It is determined that the user terminal is allowed to access the core network, and the service data message is sent to the default APN, then the message is encapsulated into a default PGW and sent to a target server through a tunnel of the default PGW.

Figure 6:
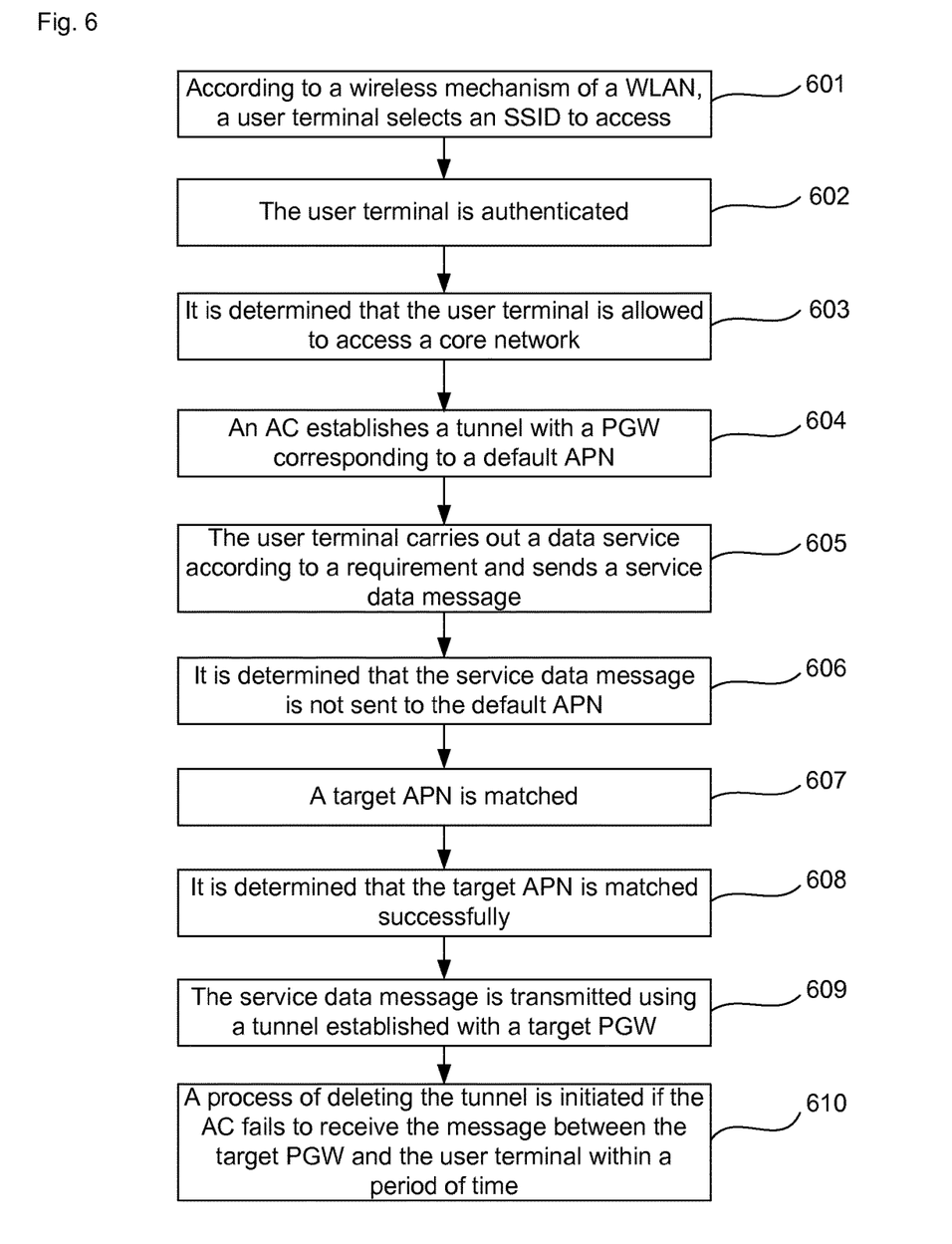
FIG. 6 is a schematic diagram of a process of sending a service data message to a non-default PGW by an AC in the second embodiment of the present disclosure.

Referring to FIG. 6, a process of sending a service data message to a non-default PGW by an AC is as follows:

Step 601 to Step 605 are the same as the Step 301 to Step 305;

Step 606: After receiving service data messages sent by the user terminal, the AC analyzes each service data message, parses out a target IP address and a target port number of a data message of the user, and determines that the message cannot be access the default APN. During the authentication process of the user terminal with the 3GPP AAA server, the 3GPP AAA server will send the AC the default APN subscribed by the user and the APNs which are allowed to access. The AC determines, according to the target IP address acquired through the parsing, whether the target IP address is a target IP address that can access the default APN. It is determined herein that they are different, or it may be determined herein that the target IP address is a target IP address that may be access the default APN, but a result of further determining whether the target port number obtained through the parsing is a port allowed to access the default APN is NO, or it is determined herein that the target IP address is not matched with an IP address and a port number of the default APN, and Step 607 is performed.

Step 607: The AC continues to match a target APN according to the target IP address of the service data message. A method for matching the target APN may be that the target APN is matched according to a corresponding relation between APNs configured statically at the AC side and a list of corresponding IP addresses, or according to a corresponding relation between APNs sent by the 3GPP AAA server to the AC through messages and a list of corresponding target IP addresses. After the target APN is matched, the AC locally decides whether the target APN is an APN allowed to access.

A decision method is that whether the target APN is an APN allowed to access is determined according to static configuration of the local AC, or according to a list of APNs allowed to access, wherein the APNs are sent by the 3GPP AAA server to the AC through messages. If the target APN is a non-default APN allowed to access and a port of the service data message is changed to allow accessing the target APN, then it may be determined that the message accesses the target APN, and a PGW corresponding to the APN is selected according to the APN;

Step 608: The AC establishes a tunnel with the selected target PGW. The AC locally records an IP address allocated by the PGW for the user. The address is not sent to the terminal and is only retained inside the AC;

Step 609: The AC replaces a source IP address of the service data message sent by the user terminal to the PGW by the IP address allocated by the target PGW to the terminal, encapsulates the IP address into the tunnel and sends the IP address to the PGW. When the message received by the AC is a message sent by the PGW to the user terminal, the AC replaces, after extracting the message from the tunnel, the target IP address of the message by the IP address allocated by the target PGW for the user, and forwards the IP address to the user terminal; and Step 610: A process of deleting the tunnel is initiated if the AC fails to receive the message between the target PGW and the user terminal within a period of time.

Figure 7:
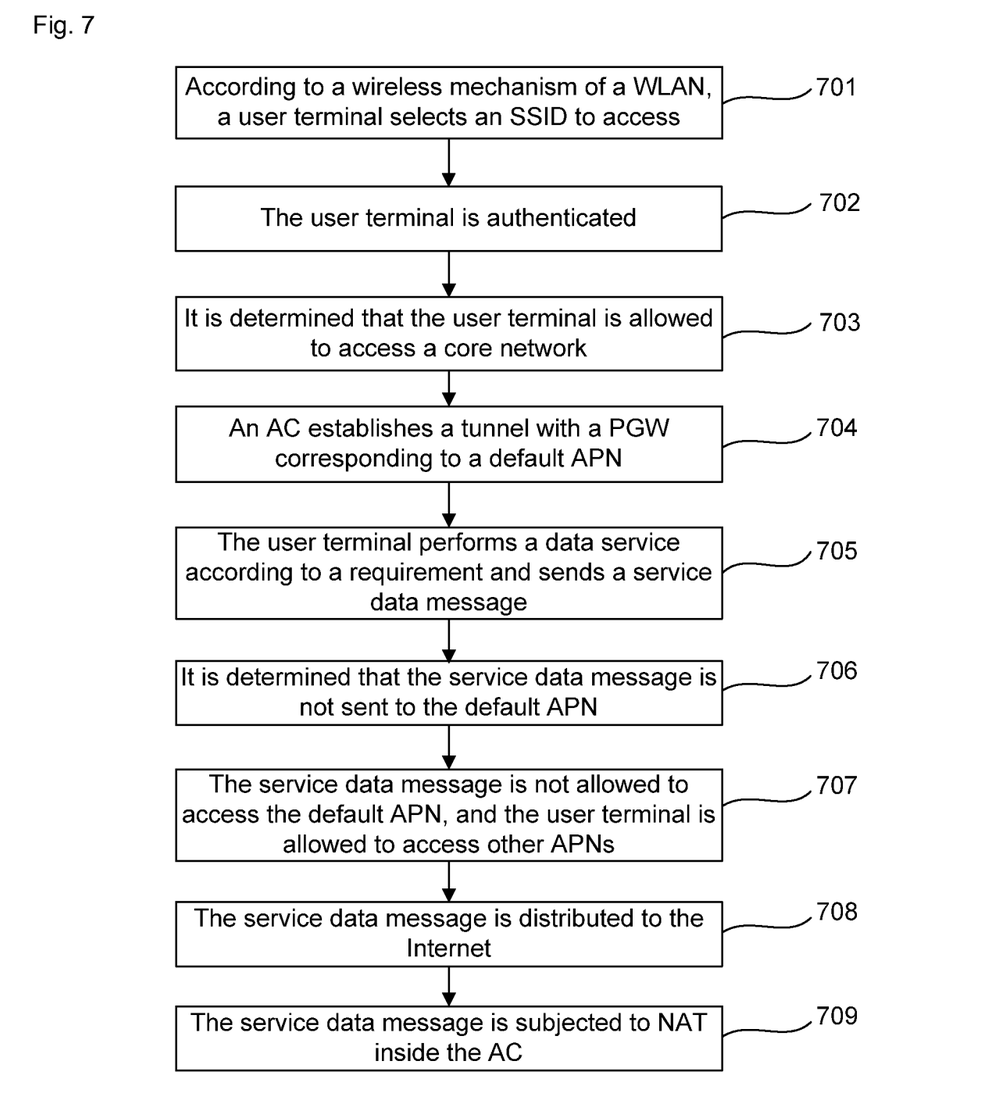
FIG. 7 is a schematic diagram of a process of distributing a service data message to the Internet by an AC in the second embodiment of the present disclosure.

Referring to FIG. 7, a process of distributing a service data message to the Internet by an AC when a user terminal of is allowed to access a core network is as follows:

Step 701 to Step 705 are the same as the Step 301 to Step 305;

Step 707: The AC determines, according to a target IP address and a target port number of the service data message through the processes of FIG. 5 and FIG. 6, that the service data message is not allowed to access the default APN, and the user terminal is allowed to access other APNs.

Step 708: The service data message is distributed to the Internet; and

Step 709: It is determined that a source IP address of the user terminal is an internal address. The service data message is subjected to Network address translation (NAT) conversion inside the AC, so as to complete conversion of an address of an internal network of the address of the terminal into an address of an external network.

Figure 8:
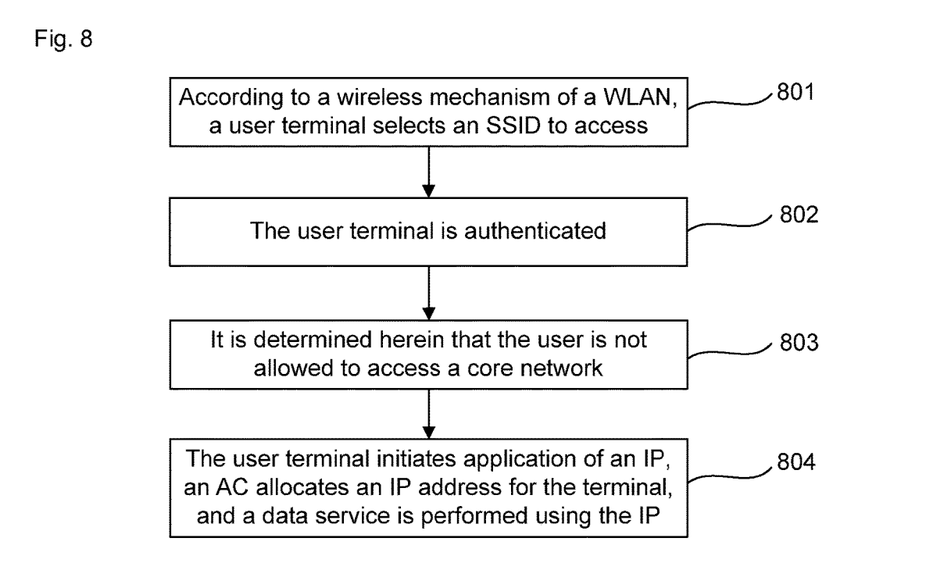
FIG. 8 is a schematic diagram of a process of determining that a user terminal is not allowed to access a core network in the second embodiment of the present disclosure.

Referring to FIG. 8, a process of determining that a user terminal is not allowed to access a core network is as follows:

Step 801: According to a wireless mechanism of a WLAN, a user terminal selects an SSID to access;

Step 802: The user terminal is authenticated. As a user authentication point, a TWAN triggers an authentication process of the user terminal in a 3GPP AAA server. After being authenticated successfully, the user is accessed into the WLAN successfully;

Step 803: During the authentication process, the AC and the 3GPP AAA server decide whether the user is allowed to access a core network. The 3GPP AAA server carries an APN subscribed by the user to the AC. It is determined herein that the user is not allowed to access the core network; and Step 804: The user terminal initiates application for an IP, the AC allocates an IP address for the terminal, and a data service is performed using the IP.

Based on the foregoing processes, an embodiment of the present disclosure further provides a system for distributing service data, including: an AC and an AAA server, wherein the AAA server is configured to authenticate a user terminal;

the AC is configured to make the user terminal access a core network, and to receive a service data message sent by the user terminal, acquire target address information contained in the service data message, and distribute the service data message according to the acquired target address information.

The AAA server is configured to provide a default APN of the user terminal for the AC. Accordingly, the AC is configured to acquire the default APN of the user terminal from the AAA server, and select a corresponding PGW according to the default APN, and establish a transmission tunnel with the selected PGW.

The AC is configured to determine whether acquired target IP address information and target port information are matched with address information of a server GW corresponding to the PGW and port information of the default APN respectively, or determine whether acquired target IP address information and target port information are matched with IP address information of the default APN and port information of the default APN respectively; if matched, send the service data message through the transmission tunnel, wherein the target address information may include the target IP address information and the target port information.

The AC is configured to match, if the target IP address information is not matched with the address information of the server GW corresponding to the PGW or the IP address information of the default APN, and/or if the target port information is not matched with the port information of the default APN, a target APN according to the target IP address information and the target port information; if the matching succeeds, send the service data message through a transmission tunnel established by a network element of a PGW corresponding to the target APN; if the matching fails, send the service data message to the Internet.

The AAA server is configured to provide other APNs to which the user terminal is allowed to access for the AC. Accordingly, the AC is configured to acquire the other APNs to which the user terminal is allowed to access, compare the target IP address information with IP address information of the other APNs to which the user terminal is allowed to access; determine whether there is an APN matched with the target IP address information; if there is an APN matched with the target IP address information, determine whether the port information is matched with port information of the APN; if matched, determine that the APN is the target APN.

The AC is configured to acquire the other APNs to which the user terminal is allowed to access, select a corresponding PGW respectively according to the acquired APNs, and establish a transmission tunnel with the selected PGWs respectively.

The AC is configured to establish, after the target APN is matched, a transmission tunnel by the network element of the PGW corresponding to the target APN, and send the service data message through the established transmission tunnel.

The forgoing content is provided for further describing the present disclosure in details in combination with specific embodiments and it shall not be construed that specific implementation of the present disclosure is limited to these descriptions. For those of ordinary skill in the art, several simple deductions or replacements may be further made without departing from the conception of the present disclosure, and these deductions or replacements should be considered as belonging to the protection scope of the present disclosure.

What is claimed is:

1. A method for distributing service data, comprising:
authenticating a user terminal and controlling the user terminal to access a core network after the user terminal is authenticated successfully;
receiving a service data message sent by the user terminal;
acquiring target address information contained in the service data message, wherein the target address information comprises target Internet Protocol (IP) address information and target port information; and
distributing the service data message according to the target address information;
wherein the distributing the service data message according to the acquired target address information comprises:
determining whether the target IP address information and the target port information are matched with address information of a server Gateway (GW) corresponding to a Packet Data Network Gateway (PGW) and port information of a default Access Point Name (APN) respectively, if matched, sending the service data message through a transmission tunnel established between a hardware Access Controller (AC) and the PGW;
or determining whether the target IP address information and the target port information are matched with IP address information of the default APN and the port information of the default APN respectively; if matched, sending the service data message through the transmission tunnel established between the hardware AC and the PGW.

2. The method for distributing service data according to claim 1, wherein accessing the core network comprises:
acquiring the default Access Point Name (APN) of the user terminal; and
selecting, according to the default APN, a Packet Data Network Gateway (PGW) corresponding to the default APN, and establishing the transmission tunnel with the PGW corresponding to the default APN.

3. The method for distributing service data according to claim 1, further comprising:
performing matching to find a target APN according to the target IP address information and the target port information for at least one of the following conditions: the target IP address information is not matched with the address information of the server GW corresponding to the PGW or the IP address information of the default APN, the target port information is not matched with the port information of the default APN;
if the matching for the target APN succeeds, then sending the service data message through a transmission tunnel established by a network element of a PGW corresponding to the target APN;
if the matching for the target APN fails, then sending the service data message to Internet.

4. The method for distributing service data according to claim 3, wherein matching the target APN according to the target IP address information and the target port information comprises:
acquiring other APNs to which the user terminal is allowed to access; and
comparing the target IP address information with IP address information of the other APNs to which the user terminal is allowed to access to determine whether there is an APN matched with the target IP address information;
if there is an APN matched with the target IP address information, then determining whether the target port information is matched with port information of the APN matched with the target IP address information; if the target port information is matched with the port information of the APN matched with the target IP address information, then the APN matched with the target IP address information is the target APN.

5. The method for distributing service data according to claim 4, wherein making the user terminal access the core network further comprises:
acquiring the other APNs to which the user terminal is allowed to access; and
selecting PGWs respectively according to the acquired other APNs, and establishing transmission tunnels with the selected PGWs respectively.

6. The method for distributing service data according to claim 4, wherein sending the service data message through the transmission tunnel established by the network element of the PGW corresponding to the target APN comprises:
after the target APN is determined, establishing, by the network element of the PGW corresponding to the target APN, the transmission tunnel; and
sending the service data message through the transmission tunnel established by the network element.

7. A system for distributing service data, comprising a hardware Access Controller (AC) and a hardware Authentication, Authorization and Accounting (AAA) server, wherein
the hardware AAA server is configured to authenticate a user terminal;
the hardware AC is configured to control the user terminal to access a core network after the user terminal is authenticated successfully, and to receive a service data message sent by the user terminal, acquire target address information contained in the service data message, and distribute the service data message according to the target address information, wherein the target address information comprises target Internet Protocol (IP) address information and target port information;
wherein the hardware AC is configured to:
determine whether the target IP address information and the target port information are matched with address information of a server Gateway (GW) corresponding to a Packet Data Network Gateway (PGW) and port information of a default Access Point Name (APN) respectively, if matched, send the service data message through a transmission tunnel established between the hardware AC and the PGW;
or determine whether the target IP address information and the target port information are matched with IP address information of the default APN and the port information of the default APN respectively; if matched, send the service data message through the transmission tunnel established between the hardware AC and the PGW.

8. The system for distributing service data according to claim 7, wherein
the hardware AAA server is configured to provide the default Access Point Name (APN) of the user terminal for the hardware AC;
the hardware AC is configured to acquire the default APN of the user terminal from the hardware AAA server, and to select a Packet Data Network Gateway (PGW)

according to the default APN, and establish the transmission tunnel with the PGW according to the default APN.

9. The system for distributing service data according to claim 7, wherein
the hardware AC is configured to
match a target APN according to the target IP address information and the target port information for at least one of the following conditions: the target IP address information is not matched with the address information of the server GW corresponding to the PGW or the IP address information of the default APN, the target port information is not matched with the port information of the default APN;
if the matching for the target APN succeeds, send the service data message through a transmission tunnel established by a network element of a PGW corresponding to the target APN;
if the matching for the target APN fails, send the service data message to Internet.

10. The system for distributing service data according to claim 9, wherein
the hardware AAA server is configured to provide the hardware AC with other APNs to which the user terminal is allowed to access;
the hardware AC is configured to acquire the other APNs to which the user terminal is allowed to access, compare the target IP address information with IP address information of the other APNs to which the user terminal is allowed to access to determine whether there is an APN matched with the target IP address information; if there is an APN matched with the target IP address information, determine whether the target port information is matched with port information of the APN matched with the target IP address information; if the target port information is matched with the port information of the APN matched with the target IP address information, determine that the APN matched with the target IP address information is the target APN.

11. The system for distributing service data according to claim 10, wherein
the hardware AC is configured to acquire the other APNs to which the user terminal is allowed to access, select PGWs respectively according to the acquired other APNs, and establish transmission tunnels with the selected PGWs respectively.

12. The system for distributing service data according to claim 10, wherein
the hardware AC is configured to establish, after the target APN is matched, the transmission tunnel by the network element of the PGW corresponding to the target APN, and send the service data message through the transmission tunnel established by the network element.

* * * * *